US005291863A

United States Patent [19]
Jones

[11] Patent Number: 5,291,863
[45] Date of Patent: Mar. 8, 1994

[54] SPIN-ON OIL FILTER ADAPTER FOR SIX CYLINDER CONTINENTAL AIRCRAFT ENGINES

[76] Inventor: Floyd B. Jones, P.O. Box 3052, Borger, Tex. 79008

[21] Appl. No.: 979,101

[22] Filed: Nov. 20, 1992

[51] Int. Cl.⁵ .................................... F01M 11/03
[52] U.S. Cl. ......................... 123/196.00 A; 184/6.024
[58] Field of Search .................. 123/196 A, 196 R; 184/6.24

[56] References Cited

U.S. PATENT DOCUMENTS

| | | | |
|---|---|---|---|
| 4,324,213 | 4/1982 | Kasting et al. | 123/196 A |
| 4,406,784 | 9/1983 | Cochran | 123/196 A |
| 4,700,670 | 10/1987 | Schade | 123/196 A |
| 5,032,259 | 7/1991 | He et al. | 123/196 A |
| 5,168,844 | 12/1992 | Waelput | 123/196 A |
| 5,236,064 | 8/1993 | Wagoner | 123/196 A |

Primary Examiner—E. Rollins Cross
Assistant Examiner—Erick Solis
Attorney, Agent, or Firm—Dunlap, Codding & Lee

[57] ABSTRACT

An adapter for mounting a conventional spin-on oil filter to the accessory of a Continental six cylinder aircraft engine. The adapter includes a tee casting and a hub which is threaded to screw into an oil screen hole of the accessory case. The tee casting has sleeve with a through bore and a base with an end for receiving a spin-on oil filter. When installed, the hub is journaled into the bore of the sleeve and screwed into the oil screen hole, which has two oil passage openings. A crown at the outer end of hub engages the sleeve of the tee casting and secures the tee casting against the accessory case. Oil input and oil output passages are formed in the hub and base. The oil input and output passages communicate with the oil passage openings and spin-on filter to circulate oil from the engine, through the spin-on filter and back to the engine.

8 Claims, 3 Drawing Sheets

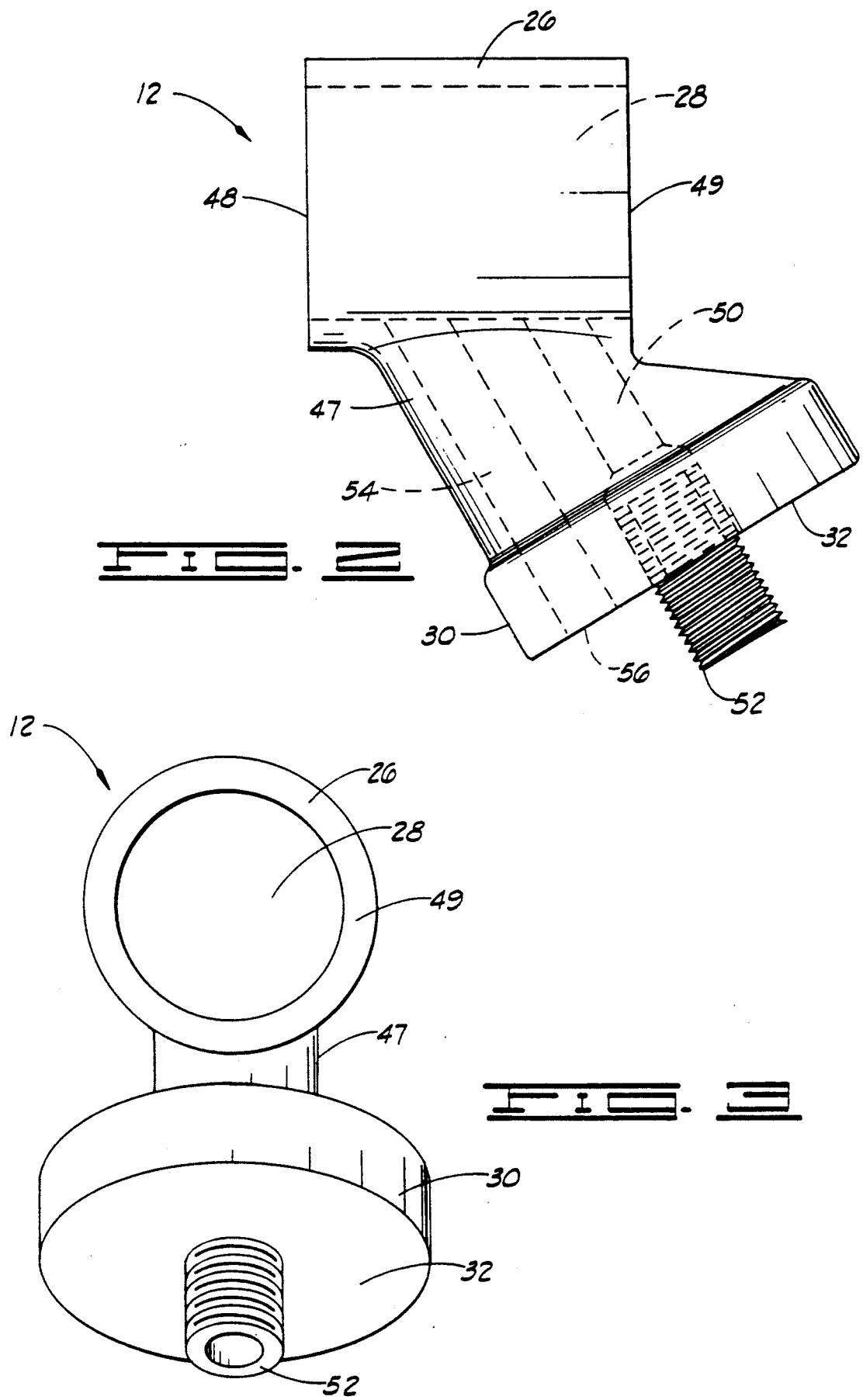

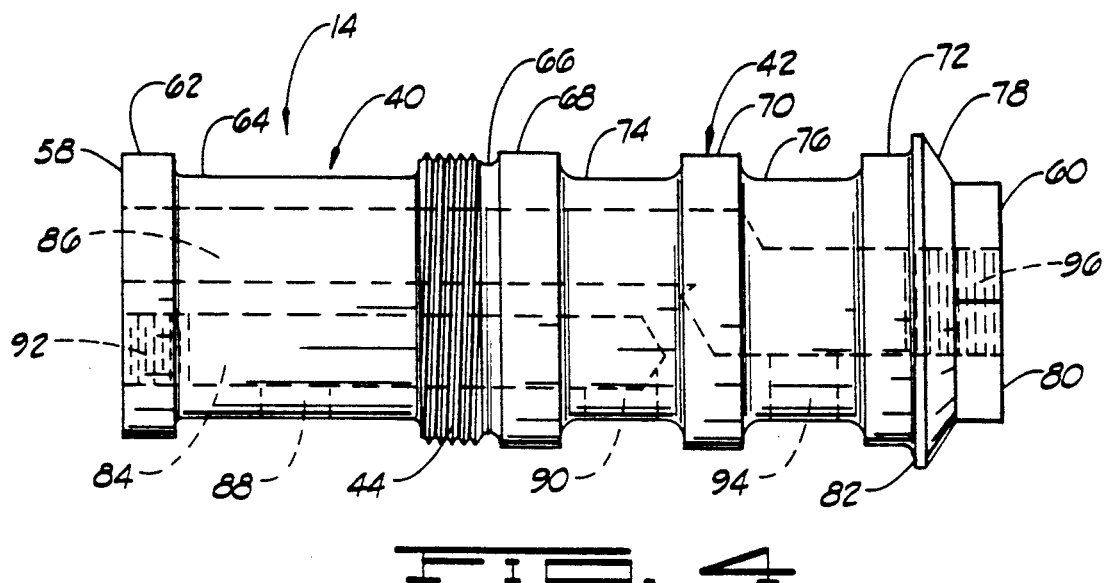
FIG. 4
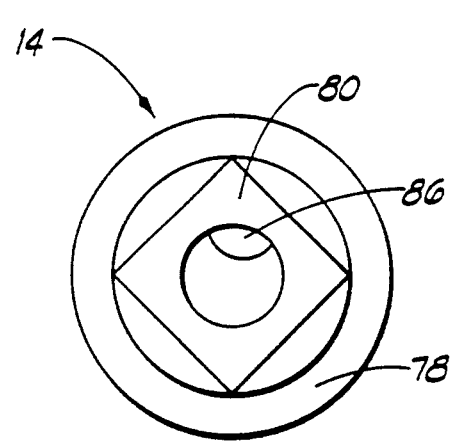
FIG. 5
FIG. 6

SPIN-ON OIL FILTER ADAPTER FOR SIX CYLINDER CONTINENTAL AIRCRAFT ENGINES

BACKGROUND OF THE INVENTION

1. Field of the Invention

The present invention relates to a device that permits the installation of a spin-on oil filter on six cylinder aircraft engines manufactured by Teledyne Continental Motors Corporation, to provide filtered oil to the engine.

2. Description of Related Art

The Continental Aircraft engine, as manufactured, is provided only with a brass screen to reduce particle contamination of the engine oil. Cartridge type oil filters, remotely mounted and connected to the engine with flexible lines, have been used to replace the brass screens. Flexible lines, however, are subject to leaks and ruptures which may result in hazards such as fire and loss of engine oil.

U.S. Pat. No. 5,006,237, issued to Jones, discloses a spin-on oil filter adapter for four cylinder Continental Aircraft engines. This particular adapter has a unitary body which is bolted to the oil cooler pad of the engine.

SUMMARY OF THE INVENTION

The accessory case of the Continental Aircraft engines have an oil screen hole with two oil passage openings. As manufactured, the oil screen hole is fitted with a brass screen for reducing contamination of the oil.

The present invention includes a tee casting and a hub which fits the oil screen hole of the accessory case. The tee casting has a sleeve and a base. The end of the base is adapted to receive a spin-on oil filter.

The hub is journaled through the sleeve and screws into the oil screen hole. A crown on the hub engages the sleeve to secure the sleeve against the accessory case when the hub is tightened into the oil screen hole.

Oil inlet and oil outlet passages are provided through the hub and the tee casting to circulate oil from the oil screen hole into the spin-on filter, and back into the oil screen hole from the spin-on filter.

It is the object of present invention to provide an easy to use and reliable oil filtering system as a replacement for the brass screen in Continental Aircraft engines.

Other advantages and features of the present invention are apparent from the following detailed description when read in conjunction with the accompanying drawings and appended claims.

BRIEF DESCRIPTION OF THE DRAWINGS

FIG. 2 is a side view of the tee casting shown in FIG. 1.

FIG. 3 is an end view of the tee casting shown in FIG. 2.

FIG. 4 is side view of the hub shown in FIG. 1.

FIG. 5 is an end view of the hub shown in FIG. 4 facing the inner end of the hub.

FIG. 6 is an end view of the hub shown in FIG. 4 facing the outer end of the hub.

DETAILED DESCRIPTION OF THE PREFERRED EMBODIMENTS

Figure 1:
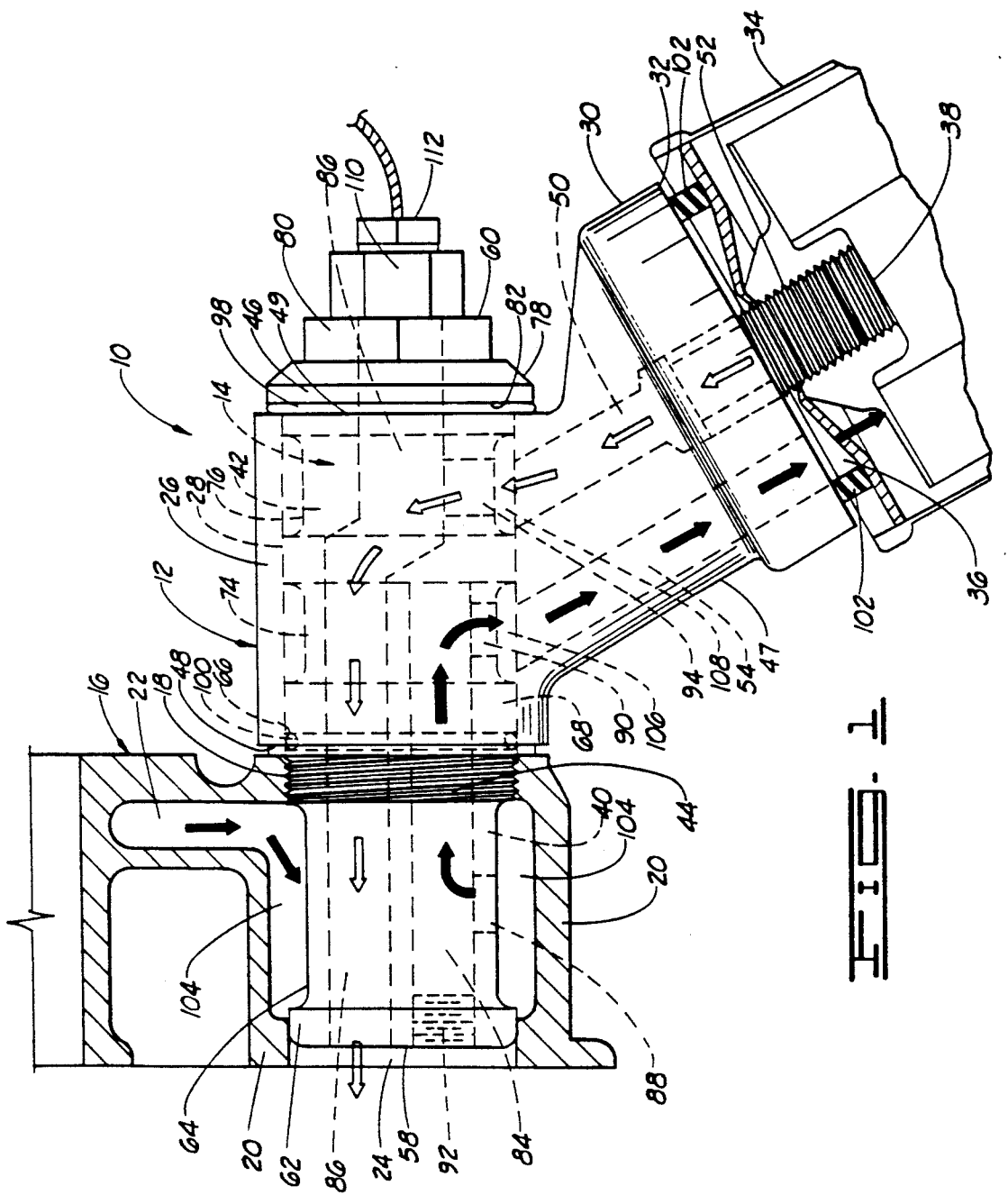
FIG. 1 is a partly sectional view showing an apparatus constructed in accordance with the present invention.

Referring now to the drawings in general, and to FIG. 1 in particular, shown therein and designated by the general reference number 10 is an adapter, which includes a tee casting 12 and a hub 14.

The adapter 10 is attached to the accessory case 16 of a Continental Aircraft engine. A portion of the accessory case 16 is shown in FIG. 1. It should be appreciated that the accessory case 16 is a conventional unit attached to the crankcase (not shown) of the engine and that oil is circulated from the oil pump to the accessory case 16 and the oil screen hole 18.

The accessory case 16 includes an oil screen hole 18 allowing access to the oil in the accessory case. The oil screen hole 18 is threaded to receive a brass screen (not shown) which is supplied by the manufacturer. The accessory case 16 is constructed with walls 20 which define a first oil passage opening 22 and a second oil passage opening 24.

Continuing to refer to FIG. 1, the tee casting 12 includes a sleeve 26 having a sleeve bore 28 therethrough and a cylindrical base 30 with a circular end 32 adapted to receive a spin-on oil filter 34. It should be appreciated that only a portion of the spin-on oil filter 34 is shown in FIG. 1. The spin-on oil filter 34 is a conventional filter having an inlet ring 36 circumscribing a centered, threaded discharge opening 38.

As illustrated by FIG. 1, the hub 14 has an inner section 40 which extends into the oil screen hole 18 and an outer section 42 which is journaled into the sleeve bore 28. The inner section 40 of the hub 14 includes an outer periphery with a threaded area 44 for screwing the hub 14 into the oil screen hole 18.

The outer section 42 of the hub 14 includes a crown 46 which engages the sleeve 26 of the tee casting 12 to secure the tee casting 12 in place against the accessory case 16. It should be appreciated that the tee casting 12 and the hub 14 are constructed so that the hub 14 fits closely within the sleeve bore 28.

Turning now to FIGS. 2 and 3, the construction of the tee casting 12 is described in greater detail. The tee casting 12 includes the sleeve 26, a neck 47 and the base 30. The sleeve 26 has an inner end 48 and an outer end 49 and the sleeve bore 28 which extends completely through the sleeve 26 between the inner end 48 and the outer end 49. The diameter of the sleeve bore 28 is sized to fittingly receive the hub 14.

The neck 47 of the tee casting 12 connects the sleeve 26 with the base 30. As shown in FIG. 2, the neck 47 extends angularly from the sleeve 26 to the base 30.

The base 30 is a short cylinder with the circular end 32 adapted to receive a spin-on oil filter 34. A central bore 50 extends from the center of the circular end 32 through the neck 47 and into the sleeve bore 28. A hollow threaded stud 52 is affixed in the central bore 50 and protrudes from the circular end 32 of the base 30. The spin-on filter 34 is secured to the base 30 by screwing the central threaded hole 38 of the filter 34 onto the hollow threaded stud 52 of the base 30. When installed in this manner, oil is in fluid communication from the filter 34 through the hollow threaded stud 52 into the central bore 50.

An offset bore 54 to the filter 34 is located at an offset from the center of the circular end 32. It should be appreciated that the offset bore 54 of the tee casting 12 is blocked from view in FIG. 3 by the hollow threaded stud 52. The offset bore 54 has a circular opening 56 at the circular end 32 which aligns with the inlet ring 36 of the filter 34. When the filter 34 is installed on the base 30, the offset bore 54 communicates with the sleeve bore 28 and with the inlet ring 36 of the filter 34. In this way, dirty oil is free to flow from the sleeve bore 28 through the offset bore 54 and into the spin-on oil filter 34.

Turning now to FIGS. 4 through 6, the construction of the hub 14 is described in greater detail. The hub 14 is generally cylindrical in shape with an inner end 58 and an outer end 60. As shown in FIG. 4, the hub 14 is divided into the inner section 40, which fits into the oil screen hole 18 of the accessory case 16, and the outer section 42, which fits within the sleeve bore 28.

At the inner end 58, the inner section 40 of the hub 14 includes an inner collar 62 which is constructed to seat against the walls 20 within the accessory case 16. Opposite the inner end 58, the inner section 40 of the hub 14 has the set of external threads 44 for securing the hub 14 in the oil screen hole 18 of the accessory case. Between the inner collar 62 and the threads 44, the inner section 40 of the hub 14 has a first annular recess 64.

To the outside of the external threads 44, the hub 14 has an annular groove 66. The annular groove 66 is sized and shaped to receive a metallic O-ring seal.

Continuing to refer to FIG. 4, the outer section 42 of the hub 14 includes two intermediate collars 68 and 70 and an outer collar 72. Between the two intermediate collars 68 and 70, the hub 14 has a second annular recess 74. Similarly, a third annular recess 76 is located between the intermediate collar 70 and the outer collar 72. It should be appreciated that the intermediate collars 68 and 70 and the outer collar 72 have an outer diameter which fits closely within the sleeve bore 28 of the tee casting 12.

As described previously, the outer section 42 of the hub includes the outer end 60 with the crown 46. The crown 46 typically includes a beveled base 78 and a square nut 80. The beveled base 78 is adjacent to the outer collar 72. Where the beveled base 78 joins the outer collar 72 the beveled base 78 has an outer diameter which is greater than that of the outer collar 72. With this construction, the beveled base 78 has an annular shoulder 82 facing the outer collar 72.

With continued reference to FIG. 4, the hub 14 has a short bore 84 and a long bore 86. The short bore 84 extends between the inner section 40 into the second annular recess 74. The long bore 86, on the other hand, extends all the way from the inner end 58 through the outer end 60 of the hub 14.

Within the first annular recess 64, a first transverse bore 88 extends from the outer periphery of the hub 14 into the short bore 84 of the hub 14. Similarly, a second transverse bore 90 extends from the outer periphery of the second annular recess 74 also into the short bore 84.

In constructing the hub 14, the short bore 84 may be made by drilling a hole from the inner end 58 of the hub 14 to a point just short of being even with the second intermediate collar 70. Then the short bore 84 is plugged in any conventional manner at the inner end 58. As indicated by FIG. 4, the short bore 84 may be plugged by threading the short bore drill-hole at the inner end 58 and screwing a threaded plug 92 into the short bore drill-hole. The first transverse bore 88 and the second transverse bore 90 may simply be drilled from the outer periphery of the hub 14 into the short bore 84.

The long bore 86 of the hub 14 may be constructed by drilling two holes, one from the inner end 58 and one from the outer end 60 of the hub 14. The two long bore 86 holes are drilled to intersect in an offset manner at a point approximately even with the second intermediate collar 70. A third transverse bore 94 extends from the outer periphery of the third annular recess 76 into the long bore 86. The long bore 86 includes a set of threads 96 at the outer end 60 for the insertion of a threaded nut.

The inner end 58 of the hub 14 is illustrated by FIG. 5. The long bore 86 is partially obstructed in view by the offset of the long bore 86 drill-holes. The short bore 84, sealed by the plug 92 at the inner end 58 of the hub 14, is shown in broken lines.

With reference now to FIG. 6, illustrating the outer end 60 of the hub 14, the square nut 80 and beveled base 78 are visible. Here again, the long bore 86 is partially obstructed in view by the offset of the long bore 86 drill-holes.

Turning back to FIG. 1, the assembly of the accessory case, the tee casting 12, the hub 14 and the spin-on oil filter 34 is described. Before installing the adapter 10, the brass screen supplied by the manufacturer is removed from the oil screen hole 18 of the accessory case 16. As mentioned above, the adapter 10 is designed to be a replacement for the brass screen in the Continental Aircraft engines.

Once the brass screen has been removed, the hub 14 is journaled into the sleeve bore 28 and screwed into the oil screen hole 18 of the accessory case 16. The annular shoulder 82 of the beveled base 78 secures the tee casting 12 against the accessory case 16 as the hub 14 is screwed into the oil screen hole 18. Typically, a metal gasket 98 is placed between the beveled base 78 and the outer end 49 of the sleeve 26. The gasket 98 prevents fluid leakage between the sleeve 26 of the tee casting 12 and the beveled base 78 of the hub 14.

At the inner end 48 of the sleeve 26, a metal seal 100 is positioned in the annular groove 66 of the hub 14. The metal seal 100 prevents fluid leakage between the accessory case 16 and the sleeve 26 at the inner end 48 of the sleeve 26.

Once the tee casting 12 and hub 14 have been installed, the spin-on oil filter 34 is screwed onto the hollow threaded stud 52 of the tee casting base 30. Typically a filter ring seal or gasket 102 is provided to prevent fluid leakage between the base 30 and the oil filter 34.

Continuing to refer to FIG. 1, the fluid flow between the accessory case 16, the hub 14, the tee casting 12 and the spin-on oil filter 34 is now described. Within the accessory case 16, the inner collar 62 of the hub 14 fits against the inner walls 20 of the accessory case 16 to prevent fluid flow between the inner collar 62 and the inner walls 20 of the accessory case 16. The first annular recess 64 of the hub 14 forms an inner annulus 104 between the hub 14 and the walls 20 of the accessory case 16.

Within the sleeve 26, an intermediate annulus 106 is formed between the second annular recess 74 of the hub 14 and the inner wall of the sleeve 26. Similarly, an outer annulus 108 is defined by the third annular recess 76 of the hub 14 and the inner wall of the sleeve 26.

Continuing to refer to FIG. 1, the offset bore 54 of the tee casting 12 is in fluid communication with the intermediate annulus 106. In the same manner, the central bore 50 of the tee casting 12 is in fluid communication with the outer annulus 108.

In operation, the adapter 10 has an inlet oil passage and an outlet oil passage between the accessory case 16 and the spin-on oil filter 34. The inlet oil passage carries dirty oil from the first oil passage opening 22 of the accessory case 16 into the spin-on oil filter 34 and the outlet oil passage conveys clean oil from the spin-on oil filter 34 into the accessory case 16 through the second oil passage opening 24.

As illustrated in FIG. 1, solid direction arrows indicate the inlet oil passage. From the inner annulus 104, dirty oil travels through the first transverse bore 88 into the short bore 84 of the hub 14. The dirty oil exits the hub 14 through the second transverse bore 90 into the intermediate annulus 106. From the intermediate annulus 106, the dirty oil passes through the offset bore 54 into the inlet ring 36 of the spin-on oil filter 34.

With continued reference to FIG. 1, the outlet oil passage is designated by hollow direction arrows. Clean oil leaves the spin-on oil filter 34 through the central opening 38 of the filter 34 and the hollow stud 52 of the base 30. The clean oil then travels through the central bore 50 of the base 30 into the outer annulus 108. From the outer annulus 108, the clean oil passes through the third transverse bore 94 into the long bore 86 of the hub 14. Finally, at the inner end 58 of the hub 14, the clean oil flows from the long bore 86 into the second oil passage opening 24 of the accessory case 16.

As previously mentioned, the long bore 86 extends through the square nut 80 of the hub 14. A threaded adaptor fitting 110 is installed in the long bore 86 at the outer end 60 of the hub 14. The fitting 110 is adapted with a conventional temperature probe 112 for measuring the temperature of the oil. The temperature probe 112 is typically connected to a temperature gauge (not shown) or other suitable device for indicating the oil temperature of the engine.

Changes may be made in the combinations, operations and arrangements of the various parts and elements described herein without departing from the spirit and scope of the invention as defined in the following claims.

What is claimed is:

1. An apparatus comprising:
    a six cylinder Continental Aircraft engine with an accessory case having an oil screen hole with two oil passage openings in the accessory case;
    a tee casting secured to the accessory case and having a sleeve with a bore therethrough, an oil input passage, an oil output passage and a base, the base having a filter receiving end, the oil input passage and the oil output passage extending from the filter receiving end of the base into the bore of the sleeve;
    a hub connected to the accessory case, the hub having an inner portion extending into the oil screen hole, an outer portion journaled through the bore of the sleeve, an oil input passage and an oil output passage, the oil input and oil output passages extending through said hub from the inner portion to the outer portion; and
    a spin-on filter connected to the filter receiving end of the base;
    wherein the oil is circulated through the oil inlet passages of the hub and the base and through the spin-on filter from one of said oil passage openings and discharged back into the other of said oil passage openings through the oil outlet passages of the tee casting and the hub.

2. The apparatus of claim 1 wherein the inner portion of the hub further comprises:
    an outer periphery having a first annular recess forming an inner annulus between the accessory case and the hub, the inner annulus being in fluid, communication with one of the oil passage openings of the accessory case.

3. The apparatus of claim 1 wherein the outer portion of the hub further comprises:
    an outer periphery having a second annular recess and a third annular recess, the second annular recess forming an intermediate annulus between the sleeve and the hub and the third annular recess forming an outer annulus between the sleeve and the hub, the intermediate annulus being in fluid communication with the oil input passages of the hub and the base and the outer annulus being in fluid communication with the oil output passages of the hub and the base.

4. The apparatus of claim 1 wherein the oil screen hole of the accessory case is internally threaded and the inner portion of the hub further comprises an externally threaded area adjacent to the outer portion of the hub for threaded connection of the hub to the accessory case.

5. The apparatus of claim 4 wherein the outer portion of the hub further comprises:
    an outer periphery with an annular groove adjacent to the threaded area of the inner portion of the hub, and
    a ring gasket positioned in the annular groove to provide a fluid seal between the sleeve and the oil cooler pan.

6. The apparatus of claim 1 wherein the outer portion of the hub further comprises:
    an outer end having a crown engaging the sleeve to secure the tee casting against the oil cooler pan when the hub is journaled through the bore of the sleeve and connected to the accessory case.

7. The apparatus of claim 6 further comprising:
    a ring gasket positioned between the crown and the sleeve to provide a fluid seal between the hub and the sleeve.

8. The apparatus of claim 6 wherein the oil outlet passage of the hub extends through the crown and is threaded at the crown, the apparatus further comprising:
    a fitting threadedly secured in the oil outlet passage, the fitting having a threaded probe hole; and
    a probe nut threaded to mate with the probe hole, the probe nut including an oil temperature probe.

* * * * *